United States Patent Office 2,981,096
Patented Apr. 25, 1961

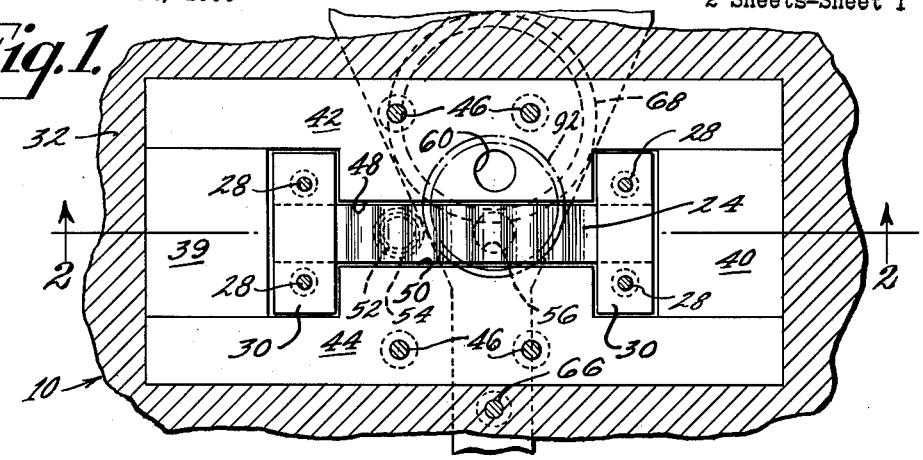
April 25, 1961     R. M. CARRELL     2,981,096
ACOUSTICAL IMPEDANCE METER
Filed Dec. 14, 1956     2 Sheets-Sheet 1
INVENTOR.
Ross M. Carrell
BY
ATTORNEY.

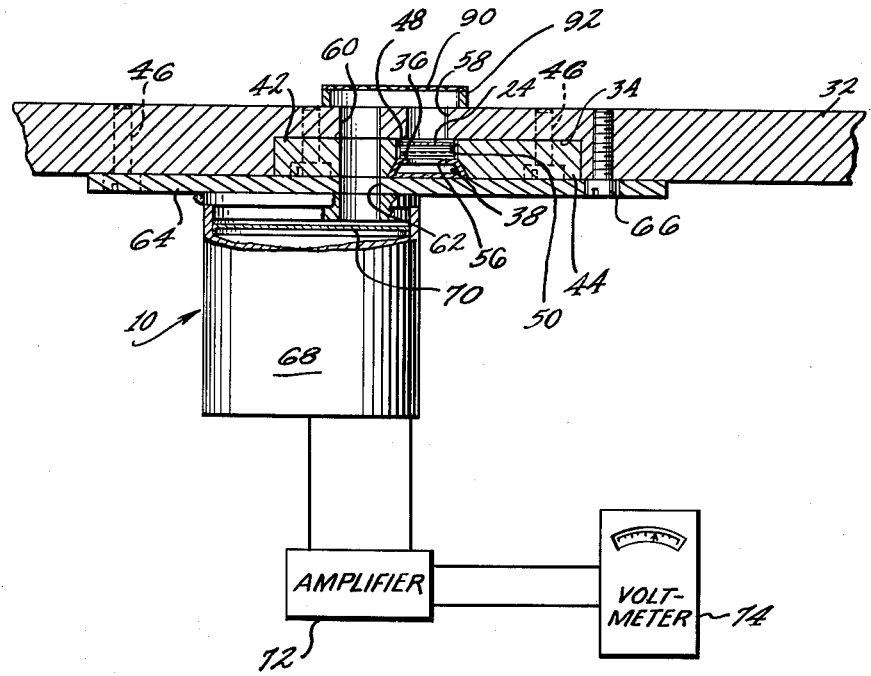

2,981,096

ACOUSTICAL IMPEDANCE METER

Ross M. Carrell, Audubon, N.J., assignor to Radio Corporation of America, a corporation of Delaware Filed Dec. 14, 1956, Ser. No. 628,411

5 Claims. (Cl. 73—67.1)

This case relates to acoustical impedance meters, and more particularly to acoustical impedance meters of the direct reading type. The direct reading acoustical impedance meter of the present invention is particularly useful for the rapid measurement of the acoustical impedance of cloth, membranes, diaphragms, pipes, acoustical absorption material, and the like.

The measurement of acoustical impedance is of particular importance in designing audio transducers because the proper operation of many of these transducers is critically dependent upon the magnitude of the impedance of some of their components. Apparatus for measuring acoustical impedance is known, but in most cases the readings derived from the apparatus requires considerable computation in order to be interpreted in terms of impedance. In some apparatus of the prior art, readings may be obtained on a point-by-point basis, and where a wide range of frequencies is to be explored, the measurements are usually quite lengthy.

Accordingly, it is an object of the present invention to provide an improved direct reading acoustical impedance meter adapted to provide readings that are directly proportional to the impedance being measured.

Another object of the present invention is to provide an improved acoustical impedance meter adapted to be connected to an automatic curve tracer whereby a plot of impedance vs. frequency may be obtained, without the main need for extensive calculations.

It is a further object of the present invention to provide an acoustical impedance meter which will read impedance directly over a wide frequency range, as well as over a wide range of magnitudes of impedances.

Still a further object of the present invention is to provide an improved acoustical impedance meter that is relatively simple in construction and operation, and yet highly efficient in use.

These objects and related advantages of the present invention are attained in an acoustical impedance meter that employs a microphone ribbon element to monitor the volume current flowing into the impedance to be measured. By the term "volume current," as used herein and in the appended claims, is meant the oscillatory movement of air resulting from the energization of a source of sound. This is analogous to the flow of alternating current in a wire. The pressure developed within the impedance is measured with a sensitive microphone. Electronic feedback means are employed to maintain the volume current monitored by the ribbon element substantially constant. Since acoustical impedance is, by definition, the ratio of pressure to volume current, it follows that the pressure measured by the sensitive microphone is then directly proportional to the unknown impedance of the component being measured.

The novel features of the present invention, as well as the invention itself, both as to its organization and method of operation, will be understood in detail from the following description when considered in connection with the accompanying drawings in which similar reference characters represent similar components, and in which:

Fig. 1 is a plan view, partly in cross-section taken along the line 1—1 of Fig. 2, and viewed in the direction of the arrows, of an acoustical impedance meter in accordance with the present invention;

Fig. 2 is a cross-sectional view of the acoustical impedance meter taken along the line 2—2 of Fig. 1, and viewed in the direction of the arrows; and Fig. 3 is a cross-sectional view of the acoustical impedance meter shown in Fig. 2, taken along the line 3—3, and viewed in the direction of the arrows.

Referring now to Figs. 1 and 2, there is shown an acoustical impedance meter 10, in accordance with the present invention, having a source of volume current, such as a sound source 12. The sound source 12 may comprise a speaker element electrically connected to an audio oscillator 14, through a variable gain amplifier 16. The sound source 12 is magnetically shielded by a heavy iron or steel casing 18. The casing 18 completely surrounds the sound source 12 except for a small opening 20 therein. The upper portion of the opening 20 is defined by an upwardly extending annular flange 22.

A ribbon element 24 is disposed within a small ribbon cavity 26 for the purpose of monitoring the volume current generated by the sound source 12. The ribbon element 24 may be one of the type used in ribbon microphones and is anchored at each end by screws 28 and insulating washers 30. It will be understood that the ribbon element 24 is electrically insulated from a top plate 32 by means of the insulating washers 30 into which the screws 28 are threaded.

The cavity 26 is defined, on top, by the bottom surface 34 of the top plate 32; on the bottom, by the upper wall 36 of a hollow member 38; on the ends, by the opposing walls of permanent magnets 39 and 40; and on the sides, by the opposing walls of pole pieces 42 and 44. The permanent magnets 39 and 40 are disposed adjacent the lower surface 34 of the top plate 32. The permanent magnets 39 and 40 are connected in a magnetic circuit by means of pole pieces 42 and 44. The pole pieces 42 and 44 are fixed to the lower surface 34 of the top plate 32 by means of screws 46. The opposing vertical walls 48 and 50 of the pole pieces 42 and 44, respectively, define the sides of the cavity 26.

The hollow member 38 is formed with a downwardly extending annular flange 52. A flexible tube 54 has one end fitted over the flange 22 of the shield 18, and its other end fitted over the flange 52 of the hollow member 38 for the purpose of forming a passageway for the volume current from the sound source 12 to the ribbon element 24. An orifice, or opening 56, in the upper wall 36 of the hollow element 38 permits the volume current flowing from the source 12 to impinge upon the ribbon element 24. An orifice, or opening 58, aligned with the opening 56 in the hollow element 38, is formed in the top plate 32 for the purpose hereinafter appearing.

An orifice, or opening 60, adjacent and parallel to the opening 58 is also formed in the top plate 32. The opening 60 is aligned with an opening 62 in a plate 64, fixed to the bottom of the top plate 32 by screws 66. The plate 64 serves as an anchoring means for a sound transducer such as a sensitive microphone 68. The diaphragm 70 of the microphone 68 is disposed as near to the opening 62 as possible. The microphone 68 is fixed to the plate 64, as by screwing onto a threaded boss, or by any other suitable means. The output of the microphone 68 is electrically connected to an amplifier 72, and the output of the amplifier 72 is connected to a voltmeter 74. The voltmeter 74 may be calibrated in acoustical ohms for measuring impedance, in a manner to be described hereinafter.

In measuring the acoustical impedance of a component, it is necessary that the volume current issuing from the orifice 58 be known. In order to realize the convenience of operation permitted by this invention it is necessary that the volume current be held constant. To this end, feedback means are provided whereby the ribbon element 24 is electrically connected across the primary winding 76 of a transformer 78. The secondary winding 80 of the transformer 78 is coupled to the input of an amplifier 82, whereby signals developed by the ribbon element 24, oscillating in a magnetic field, are amplified. The output of the amplifier 82 is rectified by a diode 84 and filtered by the filter network comprising a resistor 86 and a capacitor 88. The rectified and filtered output from the amplifier 82 is then applied to the variable gain amplifier 16 degeneratively, in a manner well known in the art, so that the amplitude of the signals from the oscillator 14, applied to the sound source 12, will be such as to compensate for any variations in the volume current impinging on the ribbon element 24.

It will be noted that the ribbon element 24 is placed immediately behind the opening 58 in the top plate 32. The ribbon element 24 is arranged so that it effectively blocks the sound passageway leading from a sound source 12 to the opening 58. The ribbon element 24 is a very thin, lightweight member. It follows that its velocity will be closely related to the volume current issuing from the opening 58. The voltage developed in the ribbon 24, by reason of the magnetic field between the pole pieces 42 and 44 and the movement of the ribbon, is utilized to maintain the volume current constant, and thereby to attain one of the essential advantages of this invention.

The second opening 60 is in close proximity to the opening 58. This opening 60 leads, by a short passageway, to the diaphragm 70 of the microphone 68, of the very sensitive pressure type. This passageway is arranged so as to produce a minimum attenuation of the sound pressure from the surface of the top plate 32 to the diaphragm 70.

The extraneous coupling between the sound source 12 and the ribbon element 24 and diaphragm 70 has been minimized by encasing the sound source 12 in the heavy iron or steel shield 18. This confines the A.-C. magnetic field from the sound source 12. The sound is conducted by the flexible tube 54, which in cooperation with the mass of the shield 18 isolates the measuring elements from the mechanical vibration from the sound source 12.

The operation of the acoustical impedance meter 10 will be described, for illustrative purposes, in connection with measuring the acoustical impedance of a sample of cloth. A sample of cloth 90, whose acoustical impedance is to be measured, is mounted on a small ring 92. The ring 92 is placed over the openings 58 and 60, and is sealed to the top plate 32 by any suitable means. It will be understood that for the measurements of more complex components, such as the input impedance of a microphone, it would be necessary to make a coupling fixture which would embrace the two openings 58 and 60 and the input opening of the component to be measured. In any case, the acoustical impedance meter 10 measures essentially the mutual impedance coupling between the two small openings 58 and 60.

To measure the acoustical impedance of the cloth 90, the oscillator 14 is turned on to energize the sound source 12. Volume current in the form of sound waves is conducted through the flexible tube 54, through the ribbon cavity 26, and into the cavity defined by the inner wall of the annular ring 92, the cloth 90, and the top surface of the top plate 32. The volume current impinging upon the ribbon element 24 produces voltage signals across the secondary winding 76 of the transformer 78. These voltage signals are amplified by the amplifier 82, rectified by the rectifier 84, and filtered by the network comprising the resistor 86 and the capacitor 88. The resulting signals are control signals fed back to the variable gain amplifier 16 degeneratively to control the amplitude of the oscillations from the oscillator 14 and to compensate for any changes in volume current at the ribbon element 24, in the manner well known in the art. Thus, the volume current in the cavity defined, in part, by the sample 90 is always constant. The pressure developed within the cavity defined by the cloth 90 is sensed by the sensitive microphone 68, amplified by the amplifier 72, and indicated on the voltmeter 74. By calibrating the acoustical impedance meter 10 with materials of known acoustical impedance, the voltmeter 74 may be made to read the acoustical impedance of the cloth 90, for example, directly in units of acoustical ohms. The minimum impedance that can be measured by the acoustical impedance meter 10 is that simply due to the mutual impedance of the two openings 58 and 60 in the plate 32. The basic configuration of the two openings in a plate is advantageous because the mutual impedance would be small.

The ribbon 24 is enclosed in the cavity 26 in a manner whereby the ribbon itself almost completely blocks the opening 58. Thus, the velocity of the ribbon element 24 is directly related to the volume current issuing from the opening 58. The validity of this assumption can be tested by exciting the ribbon in the normal manner from the sound source 12, and observing the output of the ribbon element 24 with the opening 58 blocked, and then with the opening 58 opened. The difference between these readings is about 25 db at 200 cycles per second, falling to about 10 db at 5000 cycles per second. On the basis of this test, it is concluded that the ribbon output is representative of the volume current issuing from the opening 58. Since the volume current is maintained constant, the pressure developed at the opening 60 is directly proportional to the acoustical impedance seen in common by the two openings 58 and 60.

Since the feedback means maintains the volume current substantially constant, an automatic curve tracer may be connected to the output of the amplifier 72, instead of the voltmeter 74, and a plot of acoustical impedance vs. frequency may thus be obtained.

Thus, there has been shown and described an acoustical impedance meter, in accordance with the objects of the present invention, that is simple to operate, yields immediately useful data, and is capable of good accuracy.

What is claimed is:

1. Apparatus for measuring the acoustical impedance of a component comprising a source of volume current, monitoring means responsive to said volume current, a plate formed with two adjacent through openings therein, degenerative feedback means connected between said monitoring means and said source of volume current to regulate said source and to maintain said volume current constant, means for introducing said volume current through one of said openings into a cavity defined, in part, by said component and a portion of said plate including said openings, and means including the other of said openings for measuring the acoustical pressure developed within said cavity.

2. Apparatus comprising a plate formed with a pair of relatively small adjacent through openings within a portion therein, cavity defining means comprising said portion and a component whose acoustical impedance is to be measured, a sound source, means defining a first passageway from said sound source to one of said pair of openings, a transducer, means defining a second passageway from the other of said pair of openings to said transducer, indicating means, means connecting said indicating means to said transducer, an element in said first passageway responsive to sound therein, means to provide a magnetic field in said first passageway about said element whereby to induce voltage signals across said element in response to sound in said first passageway, and means to feed back said signals degeneratively to said sound source to control said sound source in the vicinity of said element.

3. An acoustical impedance meter comprising a plate formed with a pair of relatively small adjacent through openings within a portion therein, cavity defining means comprising said portion and a component whose acoustical impedance is to be measured, a sound source, a sound transducer, means defining a first closed passageway between said sound source and one of said pair of openings, means defining a second passageway between the other of said openings and said sound transducer, indicating means, means connecting said indicating means to said sound transducer, means producing a magnetic field within said first passageway, means suspended within said first passageway responsive to sound therein to produce voltage signals thereacross, and degenerative feedback means connected between said last-mentioned means and said sound source and responsive to said voltage signals to maintain the amplitude of the sound from said sound source substantially constant.

4. Measuring apparatus comprising a first sound transducer, means to apply a source of electrical oscillations to said first transducer whereby to produce sound therefrom, a plate formed with a pair of relatively small adjacent through openings within a portion therein, cavity defining means comprising said portion and a component whose acoustical impedance is to be measured, magnetic shield surrounding said first transducer, means including a flexible tube defining a first passageway between said first transducer and one of said pair of openings, a second transducer, means defining a second passageway between the other of said pair of openings and said second transducer, indicating means, means connecting said indicating means to said second transducer, means providing a magnetic field within said first passageway, a ribbon element suspended within said first passageway in a manner to cause voltage signals to be induced thereacross in the presence of sound within said first passageway, said ribbon element being immediately adjacent said one of said pair of openings, and degenerative feedback means connected between said ribbon element and said means to apply electrical oscillations to said first transducer and responsive to said voltage signals to maintain said sound at said ribbon element substantially constant.

5. In combination, a plate formed with two through openings within a portion therein, cavity defining means comprising said portion and a component whose acoustical impedance is to be measured, a source of sound including a first transducer, magnetic shielding means encasing said first transducer, means including flexible means defining a first passageway between said first transducer and one of said pair of openings, a second transducer, means defining a second passageway between the other of said pair of openings and said second transducer, indicating means, means connecting said indicating means to said second transducer, means to produce a magnetic field within said first passageway, means within said first passageway to produce signals in cooperation with said magnetic field and in response to sound from said sound source, and means to feedback said signals degeneratively to said sound source to maintain the amplitude of said sound source substantially constant.

References Cited in the file of this patent

UNITED STATES PATENTS

| | | |
|---|---|---|
| 1,743,414 | Wente | Jan. 14, 1930 |
| 1,795,647 | Flanders | Mar. 10, 1931 |
| 1,816,917 | Smythe et al. | Aug. 4, 1931 |
| 1,935,445 | Heinz | Nov. 14, 1933 |
| 2,043,984 | Alder | June 16, 1936 |
| 2,060,009 | Alder | Nov. 10, 1936 |
| 2,576,423 | Stewart | Nov. 27, 1951 |
| 2,666,326 | Poole et al. | Jan. 19, 1954 |
| 2,837,914 | Caldwell | June 10, 1958 |

FOREIGN PATENTS

| | | |
|---|---|---|
| 840,453 | Germany | June 13, 1952 |